(12) United States Patent
Zheng et al.

(10) Patent No.: US 8,364,766 B2
(45) Date of Patent: Jan. 29, 2013

(54) SPAM FILTERING BASED ON STATISTICS AND TOKEN FREQUENCY MODELING

(75) Inventors: Lei Zheng, Sunnyvale, CA (US); Sharat Narayan, Sunnyvale, CA (US); Mark E. Risher, San Francisco, CA (US); Stanley Ke Wei, Palo Alto, CA (US); Vishwanath Tumkur Ramarao, Sunnyvale, CA (US); Anirban Kundu, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 842 days.

(21) Appl. No.: 12/328,723

(22) Filed: Dec. 4, 2008

(65) Prior Publication Data

US 2010/0145900 A1      Jun. 10, 2010

(51) Int. Cl.
  G06F 15/16    (2006.01)
(52) U.S. Cl. .............. 709/206; 709/224; 704/2; 382/124
(58) Field of Classification Search .................... 709/206
  See application file for complete search history.

(56) References Cited

U.S. PATENT DOCUMENTS

| | | | |
|---|---|---|---|
| 6,052,709 A | 4/2000 | Paul | |
| 6,393,465 B2 | 5/2002 | Leeds | |
| 6,415,318 B1 | 7/2002 | Aggarwal et al. | |
| 6,421,709 B1 | 7/2002 | McCormick et al. | |
| 6,453,327 B1 | 9/2002 | Nielsen | |
| 6,643,686 B1 | 11/2003 | Hall | |
| 6,650,890 B1 | 11/2003 | Irlam et al. | |
| 6,772,196 B1 | 8/2004 | Kirsch et al. | |
| 6,957,259 B1 | 10/2005 | Malik | |
| 7,120,455 B1 | 10/2006 | Chen et al. | |
| 7,257,842 B2 | 8/2007 | Barton et al. | |
| 7,373,385 B2 | 5/2008 | Prakash | |
| 2003/0140103 A1 | 7/2003 | Szeto et al. | |
| 2004/0177110 A1 | 9/2004 | Rounthwaite et al. | |
| 2004/0255122 A1 | 12/2004 | Ingerman et al. | |
| 2006/0053203 A1* | 3/2006 | Mijatovic | 709/206 |
| 2007/0014443 A1* | 1/2007 | Russo | 382/124 |
| 2007/0112954 A1 | 5/2007 | Ramani et al. | |
| 2007/0192863 A1 | 8/2007 | Kapoor et al. | |
| 2008/0086555 A1* | 4/2008 | Feinleib | 709/224 |
| 2009/0177460 A1* | 7/2009 | Huang et al. | 704/2 |

OTHER PUBLICATIONS

"Bloom Filter," Wikipedia, the free encyclopedia, 7 pgs., http://en.wikipedia.org/wiki/Bloom_filter (accessed May 22, 2007).
Dhamija, Rachna, "Security Skins: Embedded, Unspoofable Security Indicators," Jun. 19, 2006, 57 pgs., Harvard University.
Dhamija, Rachna et al., "Why Phishing Works," Apr. 2006, 10 pgs.

(Continued)

*Primary Examiner* — Hua Fan
(74) *Attorney, Agent, or Firm* — Frommer Lawrence & Haug LLP; John W. Branch

(57) ABSTRACT

Embodiments are directed towards classifying messages as spam using a two phased approach. The first phase employs a statistical classifier to classify messages based on message content. The second phase targets specific message types to capture dynamic characteristics of the messages and identify spam messages using a token frequency based approach. A client component receives messages and sends them to the statistical classifier, which determines a probability that a message belongs to a particular type of class. The statistical classifier further provides other information about a message, including, a token list, and token thresholds. The message class, token list, and thresholds are provided to the second phase where a number of spam tokens in a given message for a given message class are determined. Based on the threshold, the client component then determines whether the message is spam or non-spam.

15 Claims, 8 Drawing Sheets

OTHER PUBLICATIONS

Dhamija, Rachna et al., "The Battle Against Phishing: Dynamic Security Skins," Jul. 2005, 12 pgs.

Registration Demonstration; Sign-in From New Device; Sign-in Demonstration, 20 pgs., http://passmarksecurity.breezecentral.com/p70238971 (accessed Jun. 13, 2006).

Kristol, D. et al., "HTTP State Management Mechanism," Feb. 1997, 21 pgs., Network Working Group.

Taylor, Bradley, "Sender Reputation in a Large Webmail Service," 6 pgs., Google Inc.

Taylor, Bradley, "Sender Reputation in a Large Webmail Service CEAS 2006," Jul. 27, 2006, 19 pgs., Google Inc.

"Antivirus software," Wikipedia, the free encyclopedia, 4 pages, http://en.wikipedia.org/wiki/Virus_scanner, (accessed Nov. 27, 2007).

Iwanchuk, Russ, FindArticles—"IM Anti-Virus and IM Message Inspector," http://findarticles.com/p/articles/mi_zdpcm/is_200106/ai_ziff2220/print, p. 1 of 1, Oct. 29, 2007.

"Malware," Wikipedia, the free encyclopedia, 8 pages, http://en.wikipedia.org/wiki/Malware, (accessed Nov. 27, 2007).

"Instant messaging," Wikipedia, the free encyclopedia, 7 pages, http://en.wikipedia.org/wiki/Instant_messaging, (accessed Nov. 27, 2007).

International Search Report and Written Opinion, mailed Jan. 31, 2006 for Patent Application PCT/US04/35402 filed on Oct. 26, 2004.

Slashdot, FAQ—Comments and Moderation#cm600, http://slashdot.org/fq.com-mod.shtml, pp. 1-18, Nov. 15, 2007.

Flickr Community Guidelines, http:/flickr.com/guidelines.gne, pp. 1-3, Nov. 15, 2007.

Craigslist online community, craigslist help > flags and community moderation, http://www.craigslist.org/about/help/flags_and_community_moderation, updated Nov. 7, 2007.

Rennie et al., "Tackling the Poor Assumptions of Naive Bayes Text Classifiers," Proceddings of the Twentieth ICML, Washington D.C., 2003, 8 pgs.

Naive Bayes Classifier, http://www.statsoft.com/textbook/stnaiveb.html, accessed Dec. 4, 2008, 4 pgs.

Classification Using Naive Bayes, http;//www.resample.com/xlminer/help/NaiveBC/classiNB_intro.htm, accessed Dec. 4, 2008, 1 pg.

Naive Bayes Classifier—Wikipedia, http://en.wikipedia.org/w/index.php?title=Naive_Bayes_classifier&p . . . , accessed Sep. 3, 2008, 7 pgs.

Moore, Andrew W., "Naive Bayes Classifiers," School of Computer Science, Carnegie Mellon University, www.cs.cmu.edu/~awm, 2004, 11 pgs.

* cited by examiner

SPAM FILTERING BASED ON STATISTICS AND TOKEN FREQUENCY MODELING

TECHNICAL FIELD

The present invention relates generally to managing messages over a network and, more particularly, but not exclusively to employing a two phased analysis, wherein a first phase employs a statistical classifier, such as a modified naïve Bayesian classifier, to classify messages based on message content, and a second phase that is configured to target specific message classification types to capture dynamic characteristics of the messages, identifying spam messages using a token frequency based approach.

BACKGROUND

The problem of spam is well-recognized in established communication technologies, such as electronic mail. Spam may include unsolicited messages sent by a computer over a network to a large number of recipients. Spam includes unsolicited commercial messages, but spam has come to be understood more broadly to additionally include unsolicited messages sent to a large number of recipients, and/or to a targeted user or targeted domain, for malicious, disruptive, or abusive purposes, regardless of commercial content. For example, a spammer might send messages in bulk to a particular user to harass, or otherwise, disrupt their computing resources.

However, a sender of a large number of messages might not be considered a spammer. For example, an educational, financial institution, health institution, or the like, might send a large number of messages to its alumni, members, or the like. Similarly, known and/or generally acceptable merchants might send large number of messages that some recipients may actually want to receive. Such bulk message distributors may be well known by some of its recipients, who may actually seek to receive the messages. Thus, a sender of a large number of messages cannot be classified based solely upon the quantity of messages it sends.

Some traditional network level spam detectors are configured to employ various information about a message source, such as an Internet Protocol (IP) source address, a Uniform Resource Identifier (URI), such as a Uniform Resource Locator (URL), or the like, to filter messages. Such filters are configured under the belief that identification of a spammer by the source of the message enables filtering of spam messages. However, many spammers have adopted approaches to circumvent such filters by using legitimate source addresses that make such IP and/or URI based filters ineffective. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
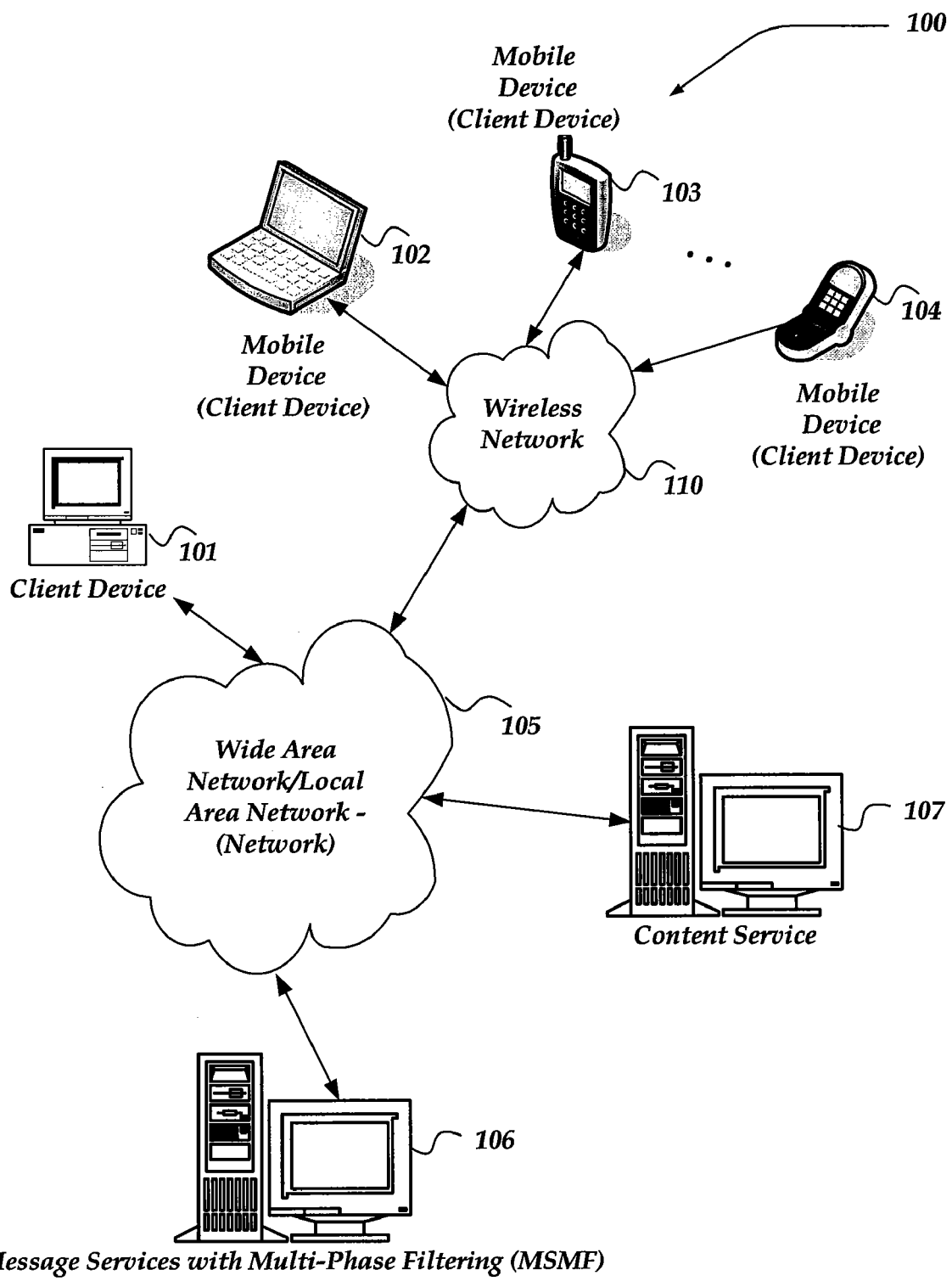
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "classifier" refers to any of a variety of message organization mechanisms useable to receive messages and to organize the messages based on some defined criteria. As used herein, the classifiers are directed towards organizing a given message based on a determination of whether the message is spam or some other type of message.

As used herein, the term "token" refers to any of a variety of possible language units, such as a word, a phrase, a number, a symbol, or the like, that represents a smallest unit of language that conveys meaning. As disclosed below, a message body may be decomposed into one or more tokens using a tokenizer, which represents a set of language specific rules that define a boundary of a token. As non-exhaustive, non-limiting examples, consider a message body that includes "Hello, world!" In one embodiment, the message body may be decomposed into two tokens, "hello" and "world". The white space, comma, and other delimiters may be used as token separators.

As used herein, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards classifying messages as spam or non-spam using a two phased approach. The first phase employs a statistical classifier, such as a modified complement naïve Bayesian classifier, to classify messages based on message content. The second phase is configured to target specific message classification types to capture dynamic characteristics of the messages and provide identify spam messages using a token frequency based approach. In one embodiment, a client/server structure may be used, where a client component receives messages and send the messages to the statistical classifier. The statistical classifier determines a probability that a message belongs to a particular type of spam or non-spam class. The statistical classifier further provides other information about a message, including, a token list, and token thresholds. The message class, token list, and thresholds are provided to the second phase where a number of spam tokens in a given message for a given message class are determined. Based on the threshold, the client component then determines whether the message is spam or non-spam.

In one embodiment, the server component (e.g., phase two) may maintain the tokens sent from the client components. In one embodiment, common tokens may be removed, such as "we," "you," "is," or the like. The server component may then aggregate the frequency of each token. At selected times, such as every minute, or so, a frequency count for each token may be reduced to age the tokens. In this manner, tokens may be set to expire over time. This may be performed, in one embodiment, to reflect that some spammers send certain spam within bursts, or over short time periods. In one embodiment, a maximum count may be set for the aggregated count for each token to avoid allowing certain tokens from becoming too popular and overwhelming other tokens. In one embodiment, once the server component receives a token list from a client, the server component may update the frequency of each token in a list, as well as age the tokens. The server component may then send back to the client component a number of tokens considered to be bad, for a given message class. In one embodiment, popular tokens besides those in the common stop-word list may be considered as bad tokens for the message class. By employing the second phase, token frequency based approach, false-positives that may be created by using only the first phase, the statistical classifier, may be reduced.

It is noted that while one embodiment employs a client/server structure, the invention is not so limited. Other configurations may also be used, including, but not limited to a peer-to-peer structure, or even a single structure that is configured to perform functions of both the client and the server as described herein.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, content service 107, and Message Services with Multi-Phase Filtering (MSMF) 106.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as MSMF 106, or the like. Such user account, for example, may be configured to enable the user to receive emails, send/receive IM messages, SMS messages, access selected web pages, or participate in any of a variety of other social networking activity. However, managing of messages or otherwise participating in other social activities may also be performed without logging into the user account.

A user of client devices 101-104 may employ any of a variety of client applications to access content, read web pages, receive/send messages, or the like. In one embodiment, each of client devices 101-104 may include an application, or be associated with an application that resides on the client device or another network device, that is useable to filter received messages. In one embodiment, a message filter might reside remotely on content service 107, a messaging server, such as MSMF 106, or the like. In another embodiment, a component, such as a client classifier component might reside within client devices 101-104 for use in organizing messages into different folders, categories, or the like, based in part on whether the message is classified as spam or non-spam, or the like. In one embodiment, the messages might be organized based on various tags, labels, or the like, that indicate whether a message is classified as spam, non-spam, or the like.

In another embodiment, the client classifier component might reside remotely on another network device, such as content service 107, a messaging server, such as MSMF 106, or the like. In either embodiment, the client component may interact with a server component to classify the messages, as described in more detail below.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple MSMF 106, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Content service 107 represents any of a variety of computing devices useable to provide content to another computing device. As such, content service 107 may represent a website, a merchant site, an educational site, a financial site, or the like. The content may include, text, graphics, music, audio files, video files, or virtually any other type of content that may be distributed over a network, such as networks 105, 101, or the like.

In one embodiment, content service 107 may also provide messages to another computing device, such as IM messages, emails, MMS messages, SMS messages, or the like. In one embodiment, such messages may be considered as legitimate or non-spam messages. However, in another embodiment, at least some of the messages might be considered as spam messages, fraudulent messages, scam messages, or the like. For example, in one embodiment, a message from content service 107 might include content that may be considered as for adult viewing only, or otherwise unacceptable for routing.

It should be noted that while content service 107 is illustrated as one example of a computing device that may provide spam or other unauthorized messages to other computing devices, such messages are not to be considered exclusive to content service 107. For example, one or more of client devices 101-104 might also be employed to send such unauthorized, and/or undesired messages, including spam, to one or more other computing devices.

MSMF 106 includes virtually any network computing device that is configured to manage messages received over a network. In one embodiment, MSMF 106 may include a message server that is configured to receive messages and route them to an appropriate client device, or the like. Thus, MSMF 106 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, and the like. However, MSMF 106 may also include a message server configured and arranged to manage other types of messages, including, but not limited to SMS, MMS, IM, or the like.

MSMF 106 may further include one or more message classifiers useable to initially classify received messages as a spam message, a bulk message, a ham message, or the like. In one embodiment, the message classifiers may be configured to determine a probability that a message is of a particular class of messages based on a statistical analysis of at least a text body of the message. In one embodiment, the classifier might be a Bayesian classifier, however, the invention is not so limited, and other classifiers may also be used, including, but not limited to artificial intelligence approaches, various machine learning algorithms, or the like. Non-exhaustive examples include Naïve Bayes, Support-Vector machines, logistic regression, perceptrons, Markovian discrimination approaches, neural networks, decision trees, or the like. Further, each of these algorithms may be employed different variations, such as regularization, feature weighting, or the like. In one embodiment, a modified complement naïve Bayesian Classifier may be used.

In one embodiment, the message classification, along with other information about the message might be provided to a second phase that is configured to operate on specific classes of messages using a token frequency based approach to confirm whether the message is properly classified or to provide information useable to reclassify the message.

Figure 4:
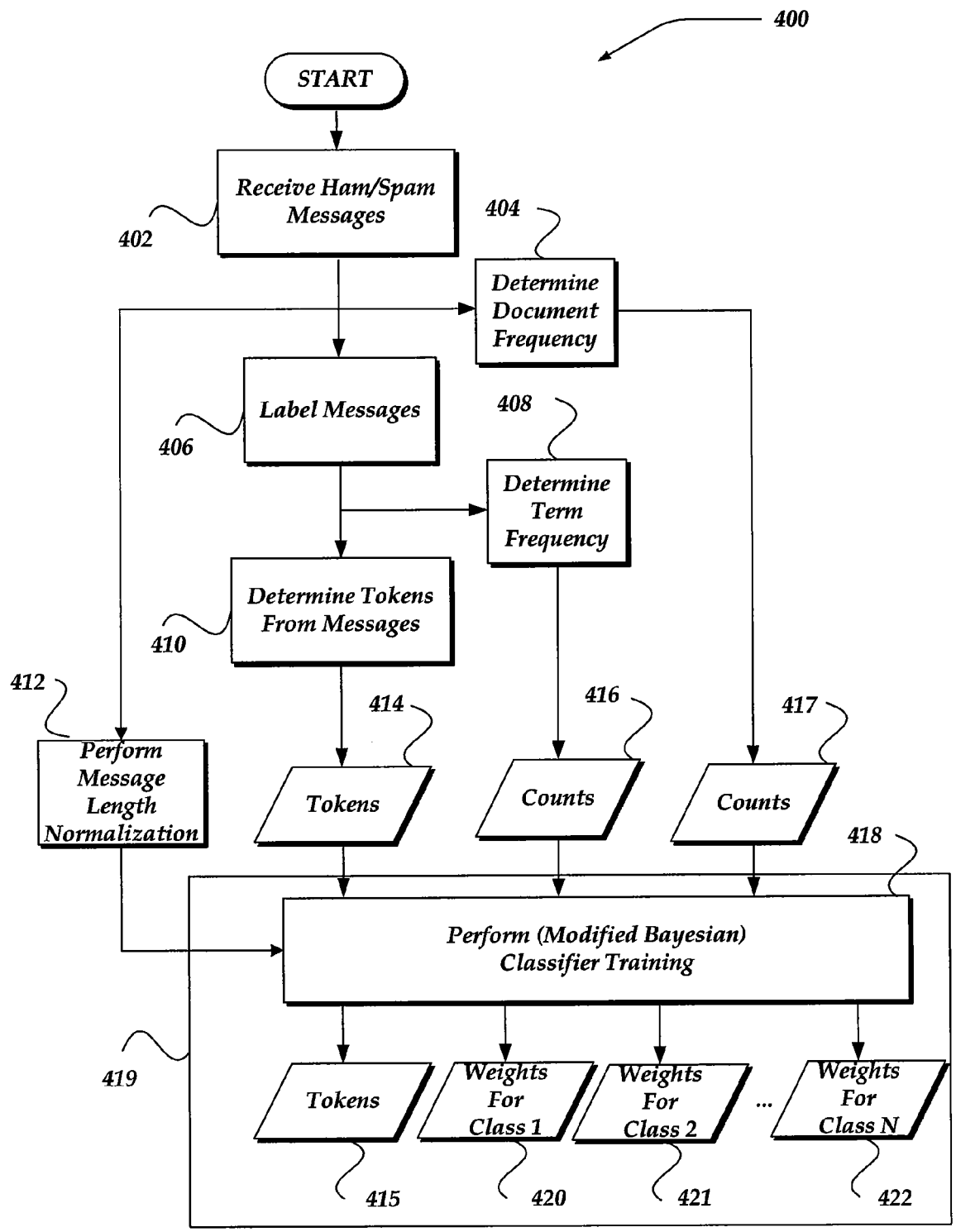
FIG. 4 illustrates a logical flow diagram generally showing one embodiment of a mechanism useable to train a modified naïve Bayesian Classifier, or other statistical filter.
Figure 5:
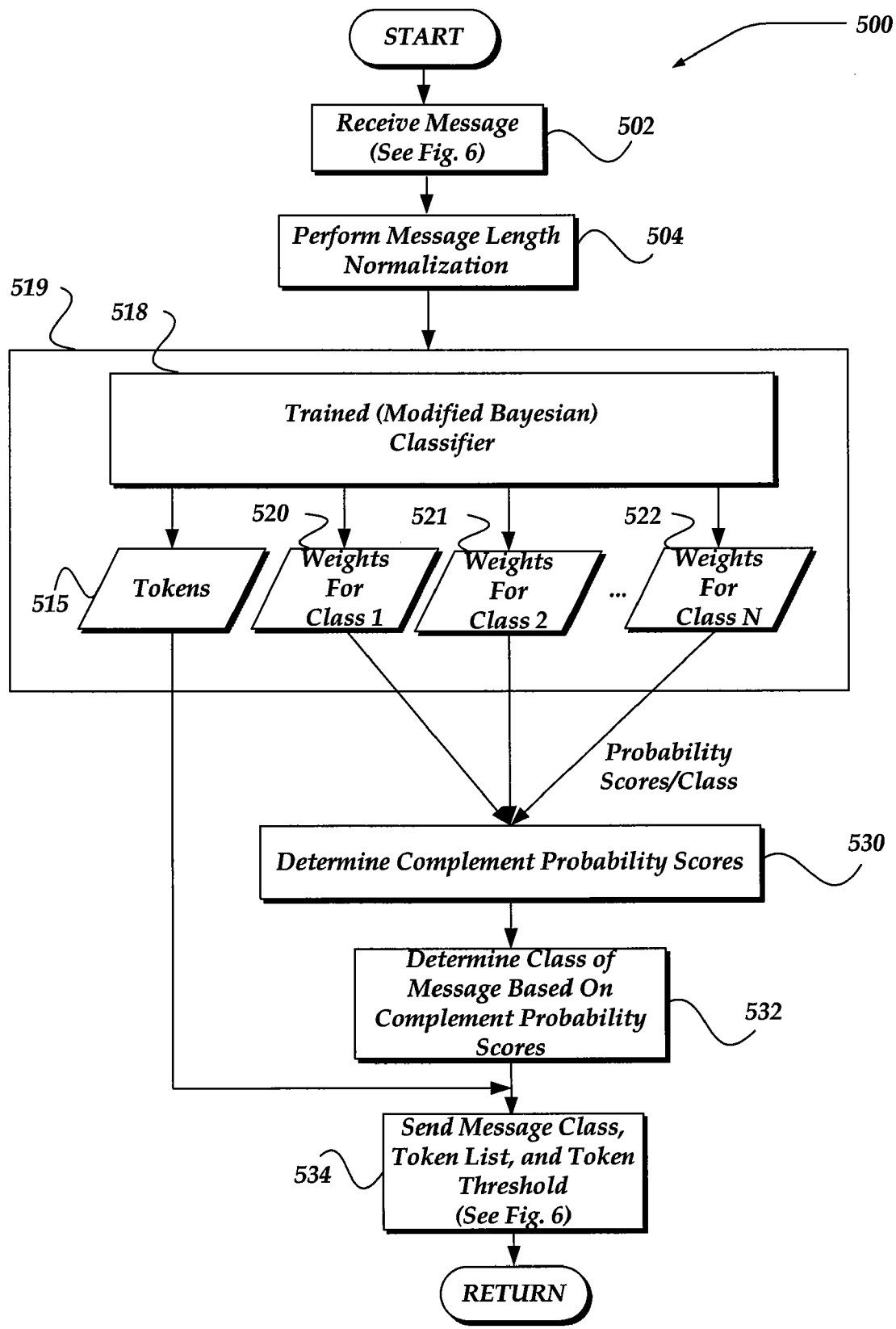
FIG. 5 illustrates a logical flow diagram generally showing one embodiment of a mechanism useable to classify messages into different classifications, using a trained modified naïve Bayesian Classifier, or other statistical filter.
Figure 6:
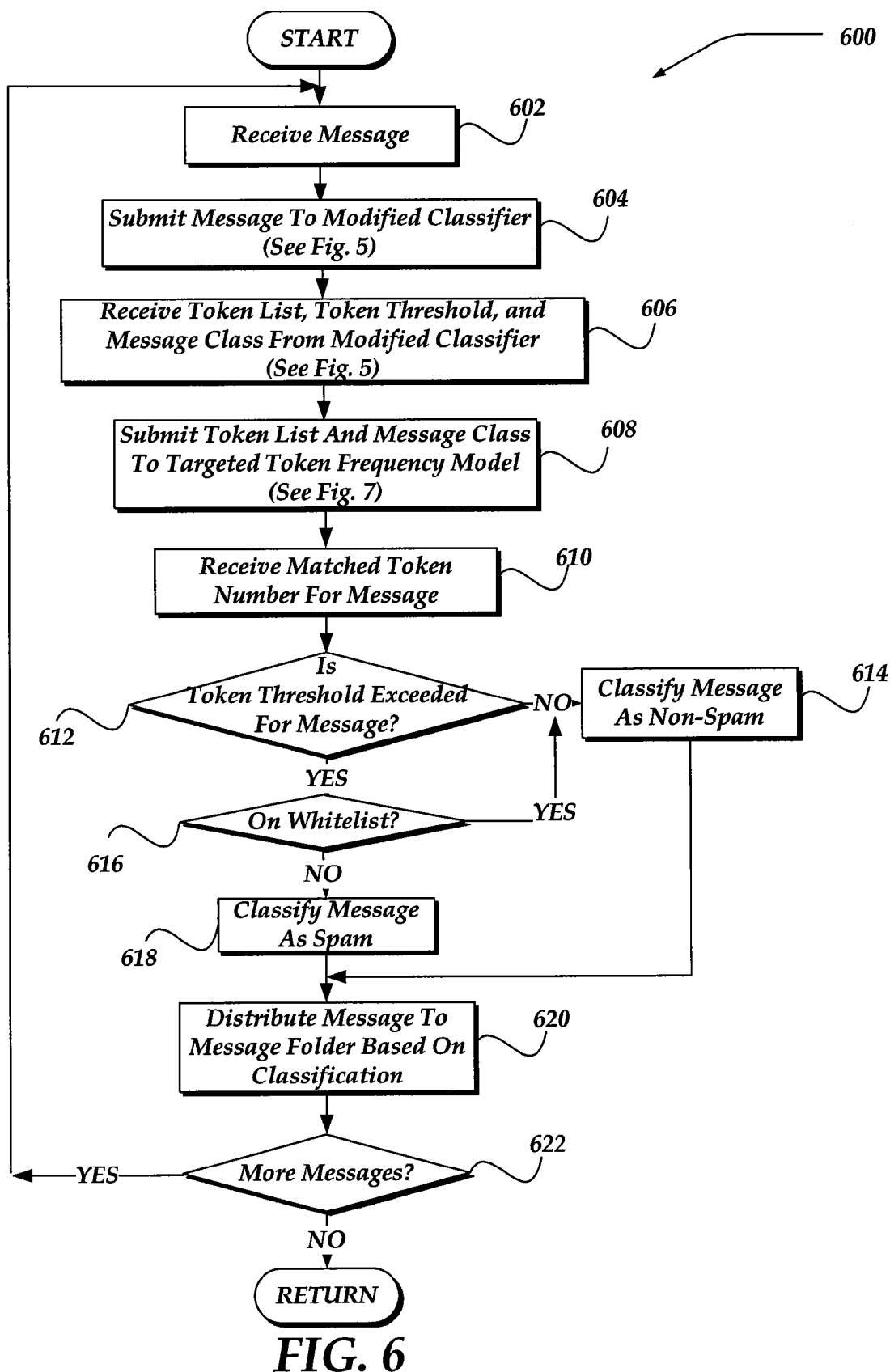
FIG. 6 illustrates a logical flow diagram generally showing one embodiment of a client process using a two phased spam detector to classify a message as spam or non-spam.

In one embodiment, the statistical classifier and the token frequency based approach are configured into a server component that interacts with a client component. The client component may reside within a client device, such as client devices 101-104, and/or within MSMF 106 to coordinate message flows to the server component, and to further classify messages. FIGS. 4-5 described in more detail below illustrate the statistical classifier component, while FIGS. 7-8 described in more detail below illustrate the token frequency based component. FIG. 6 described in more detail below illustrates the client component and its interactions with the other components to classify messages into spam, non-spam, or the like.

Devices that may operate as MSMF 106 include, but are not limited to personal computers, desktop computers, multiprocessor systems, microprocessor-based or programmable consumer electronics, network PCs, servers, network appliances, and the like.

Although MSMF 106 is illustrated as a distinct network device, the invention is not so limited. For example, a plurality of network devices may be configured to perform the operational aspects of MSMF 106. For example, in one embodiment, the message classification may be performed within one or more network devices, while the message server aspects useable to route messages may be performed within one or more other network devices.

Illustrative Client Environment

Figure 2:
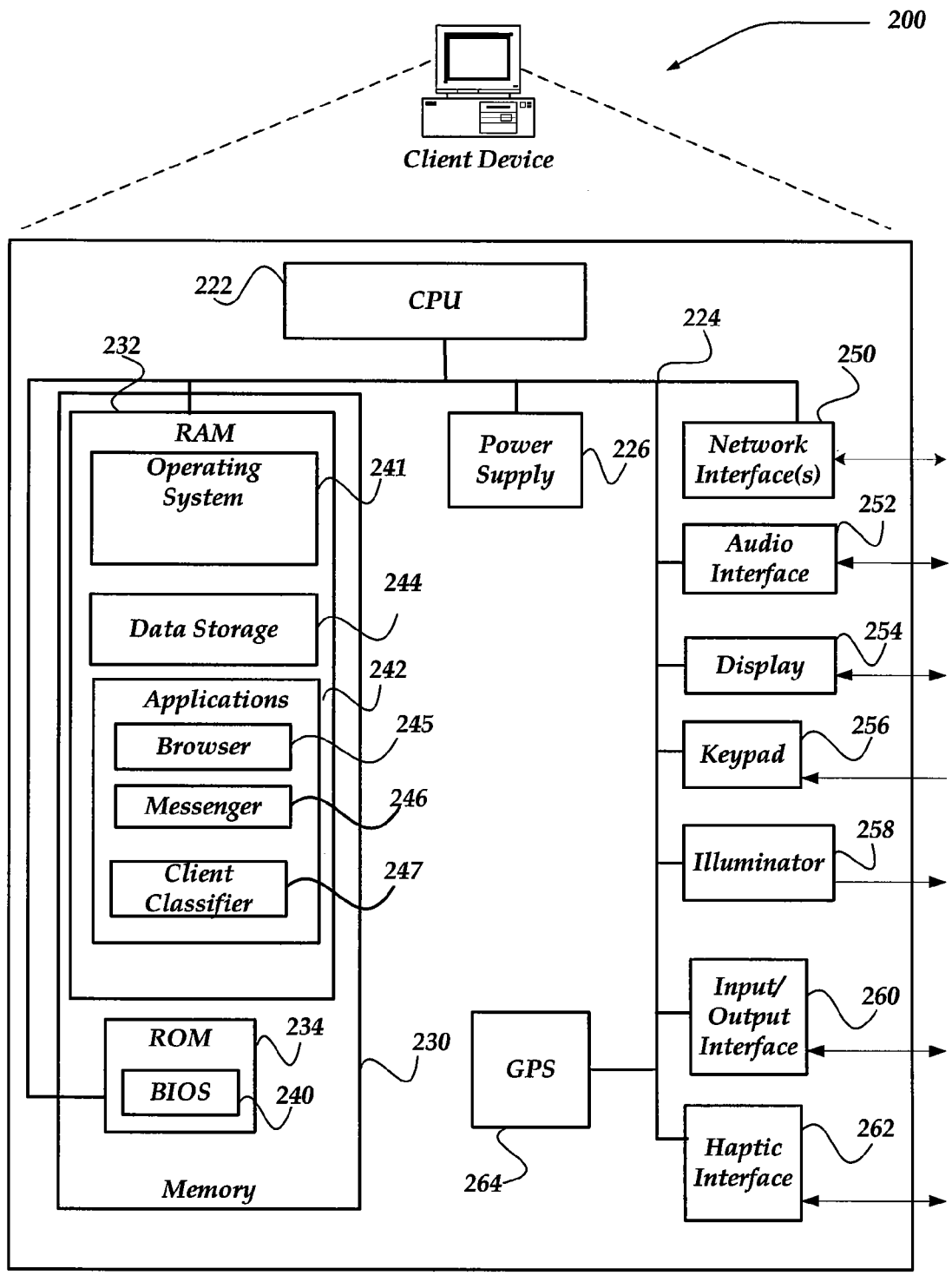
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200;

and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 244 may also be employed to store personal information including but not limited to contact lists, personal preferences, data files, graphs, videos, or the like. Data storage 244 may further provide storage for user account information useable with one or more message addresses, message folders, or the like. Thus, data storage 244 may include various message storage capabilities to store and/or otherwise manage message folders, such as email folders for spam messages, ham messages, bulk messages, inbox messages, deleted messages, or the like. In one embodiment, messages may also be stored in data storage 244 and be associated with tags, labels, or other identifiers indicating whether a message is classified as ham, spam, non-spam, or the like. In one embodiment, data storage 244 may also store and/or otherwise manage message classification data from traditional message filters. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, and client classifier 247.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols. In one embodiment, messenger 243 may employ various message boxes or folders to manage and/or store messages.

In one embodiment, client classifier 247 may be configured to reside within client device 200 as illustrated. However, in another embodiment, client classifier 247 might reside on a remote network device, such as MSMF 106 of FIG. 1. In any event, client classifier 247 may be configured to receive messages. Client classifier 247 may then provide the messages to a server classifier component described in more detail below where the messages may initially be classified into various classes. Additional information about the message, and/or message class might be provided, including, but not limited to a token list, token threshold, or the like. Such additional information may then be provided to a second phase of the server component to determine a number of tokens that may match a characteristic for a given message class. Client classifier 247 may then determine whether the number of matching tokens exceed a token threshold for the given message class. Based on the comparison to the token threshold, client classifier 247 may classifier the message as spam, non-spam, or the like. In one embodiment, client classifier 247 may further employ a white-list, black-list, grey-list, or the like, to further classify, and/or re-classify a message. Client classifier 247 may then provide the classified messages to messenger 246 for viewing, deletion, or the like, by a user. One embodiment of a process useable by client classifier 247 is described in more detail below in conjunction with FIG. 6.

Illustrative Network Device Environment

Figure 3:
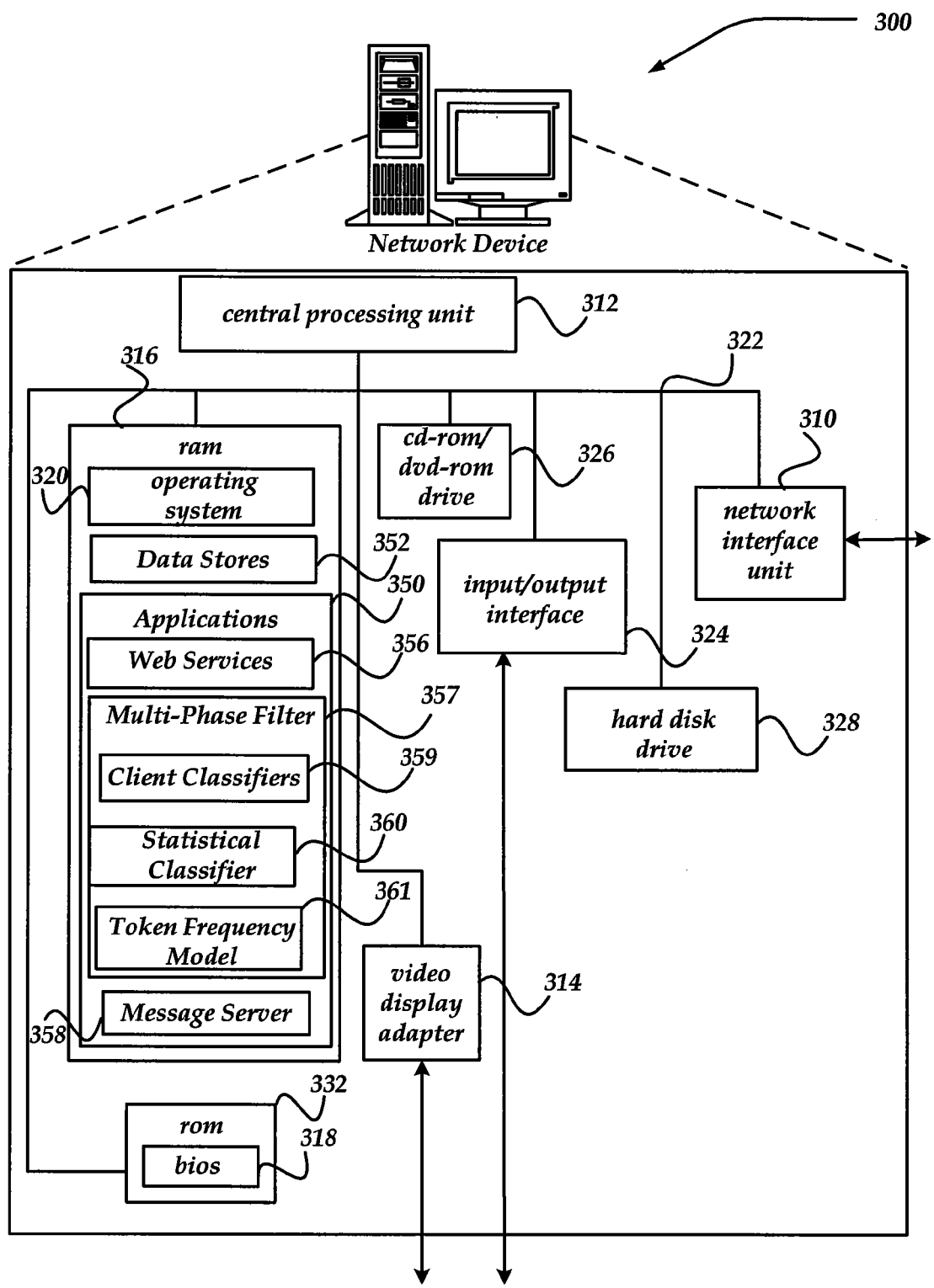
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, MSMF 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 352. Data store 352 may be include virtually any mechanism usable for store and managing data, including but not limited to a file, a folder, a document, or an application, such as a database, spreadsheet, or the like. Data store 352 may manage information that might include, but is not limited to web pages, messages, classifier training data, token hash tables, token threshold values, token aging data, or the like, associated with a user, as well as scripts, applications, applets, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, Message Server (MS) 358, and multiphase (message) filter (MF) 357. In one embodiment, MF 357 includes a client component, client classifier 359, as well as a server component that comprises a statistical classifier 360 and token frequency model 361. In another embodiment, client classifier 359 might reside remote to network device 300, such as on a client device, such as client devices 101-104 of FIG. 1.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. In one embodiment, web services 356 may interact with message server 358, and/or MF 357, when a client device requests a message.

Message server 358 may include virtually any computing component or components configured and arranged to forward messages from message user agents, and/or other message servers, or to deliver messages to a local message store, such as data store 352, or the like. Thus, message server 358 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types.

MF 357 is configured to manage messages by examining at least a content of the message and perform statistical classifications of the messages as an initial phase to classify the messages into different classes. Based on the initial classifications, MF 357 may then apply a targeted token frequency based analysis to determine whether the message is properly classified. The classification confirmation may provide a threshold value for tokens within the message that may be used to further confirm the classification of the message as spam, non-spam, or the like.

In one embodiment, client classifiers 359 may be configured for use for a plurality of different users. Thus, MR 357 is configured in one embodiment, to operate at a network level over a message user population, rather than at a by individual basis.

Moreover, MF 357 is configured to enable statistical classifier 360 to be trained based on a number of different types of messages over a period of time that enables lowering of false positive rates. In one embodiment, statistical classifier 360 may be trained based on specific classes of spam message content. For example, in one embodiment, statistical classifier 360 may be trained to recognize and thereby classify messages as being Nigerian, Lottery, Adult content messages, or the like. In one embodiment, such training might be performed by collecting message samples specific to a class or type of spam to be detected, and training statistical classifier 360 to recognize such classes or types of messages. It is noted that the examples above are non-exhaustive and non-limiting, and clearly, statistical classifier 360 may be trained for any of a variety of other types of messages, and/or quantity of types.

In any event, statistical classifier 360 may be configured with a decision boundary tuning mechanism that through a post training validation state, may adjust the decision boundary based on various factors, including, but not limited to: a cost of a false positive rate, a composition of a training data set, and/or a measure of a significance of different spam message content.

In one embodiment, extra parameters may be employed to limit a kind of message that MF 357 operates upon. That is, in one embodiment, MF 357 might be employed based on the parameters learned from the training data set, to employ a total number tokens, a length of a message body, or the like. In another embodiment, MF 357 may be configured to employ user feedback about classification of a message to refine its decisions.

Generalized Operation

The operation of certain aspects of the invention will now be described with respect to FIGS. 4-8. Briefly, FIGS. 4-5 illustrate training and using a statistical classifier, such as a modified naïve Bayesian Classifier, or the like. The classifier provides a base line classification for messages based on various assumptions of certain message features, assigning a probability value to the features to occur in a particular class of messages. In one embodiment, the classifier is a modified version of a naïve Bayesian classifier, sometimes referred to as a complement naïve Bayes Classifier. However, other types of classifiers may be used, without departing from the scope of the invention. In one embodiment, given a training set of messages, a probability of various message features not being present in a class is calculated. The complement probability values are then calculated fro the features and for the classes. In one embodiment, as shown in the figures, before a final complement probability table is generated, messages may undergo various transformations including, but not limited to a length normalization to minimize effects of longer messages from biasing a probability value for tokens. Another transformation may include a term frequency transformation and/or an inverse document transformation, as described further below.

As noted FIGS. 4-5 represent a first phase of a multi-phase message filter that may be implemented within a network device, such as MSMF 106 of FIG. 1.

As noted, FIG. 4 illustrates a logical flow diagram generally showing one embodiment of a mechanism useable to train a modified naïve Bayesian Classifier, or other statistical filter. As shown in the process 400 of FIG. 4, training messages are received at block 402. In one embodiment, the training messages are classified as known to be ham messages (non-spam), or spam messages at bock 406. In one embodiment, the messages might be further classified as a particular type or class of spam, such as Nigerian, Lottery, Adult, or the like.

At block 404, in one embodiment, messages (or generally, virtually any document) might be transformed to discount certain tokens that occur in a document. Common words, for example, such as "we," "you," "have," or the like, might be unlikely to be related to a class of a message. However, random variations of such words and/or other symbols, or the like, might create otherwise fictitious correlations, resulting in adding noise to a classification and thus erroneous classification weighting. Because common words may appear often, it is advantage to either remove such words or tokens, or, in one embodiment, to down weight such tokens. One embodiment of a heuristic transformation, known as a document frequency or inverse document frequency, discounts terms in a document based on their document frequency. One embodiment might use a frequency function such as:

$f'_i = f_i \log(\Sigma_j 1/\Sigma_j \delta_{ij})$ where $\delta_{ij}$ is 1 if a word or other token i occurs in document j, otherwise it is 0, and the sum is over all document indices. In this manner, rare words are given increase term frequencies, while common words are given less weight. The result of block 404 is fed into 417 where a count for the tokens is then determined.

Block 408 is configured to perform a term frequency transformation. Some term or word distributions tend to have heavier frequency distribution tails than might be predicted by a multinomial model, and instead appearing more like a power-law distribution. Therefore, a term frequency transformation may be applied to the messages to make such power-law distributions look more multinomial term distributions. While a variety of different mechanism may be used, one such term frequency transformation is described in more detail in an article entitled "Tackling the Poor Assumptions of Naïve Bayes Text Classifier," by Jason D. M. Rennie, et al., published in the Proceedings of the Twentieth International Conference of Machine Learning (ICML-2003), Washington D.C., 2003, which is incorporated herein by reference in its entirety. The outcome of such transformation is provided to 416 as a token count.

At block 410, the tokens may be determined from the messages using a set of language specific rules that define a boundary of a token. In one embodiment, block 410 is also known as a tokenizer, because it is useable to convert a block of text into one or more tokens. The tokens are then provided to block 414.

At block 412, message lengths are normalized to ensure that longer messages do not bias a probability value for tokens. That is, in one embodiment, the length of long messages or other documents may be discounted by transforming a token or term frequency based on, for example:

$f'_i = f_i / (\text{square root of } (\Sigma_k (f_k)^2))$, which provides a length term frequency vector of 1 for each document. However, it should be noted that other transformations may also be used, including, but not limited to splitting documents into multiple uniform lengths and maintaining links between the portions of the split document.

In any event, as illustrated the length transformation, tokens 414, and counts 416-417 are provided to the modified Bayesian Classifier 418 to train the classifier, such that it may output weights 420-422 for different classes or types of messages. For example, in one embodiment, weights 420-422 might represent weights for non-spam messages, Nigerian messages, Lottery messages, or Adult content messages, respectively. However, as noted elsewhere, the invention is not limited to these examples. Moreover, tokens 415 may represent a hash table of tokens. For example, tokens 415 might operate as a fast data structure, or the like, configured to store a dictionary of tokens and/or their associated frequencies/weights.

FIG. 5 illustrates a logical flow diagram generally showing one embodiment of a mechanism useable to classify messages into different classifications, using a trained modified naïve Bayesian Classifier, or other statistical filter. Process 500 of FIG. 5 then typically employs a trained modified naïve Bayesian classifier 518 that is trained using process 400 of FIG. 4.

Process 500 begins at block 502 where an unknown message is received. In one embodiment, the message is received from a client classifier component process such as is described in more detail below in conjunction with FIG. 6.

The received message may be provided to block 504, where the message length is normalized using any of a variety of mechanisms, including, but not limited to those described above in conjunction with FIG. 4. It should be noted, that while not shown, the receive message may also undergo other transformations, including, but not limited to term frequency transformation, and/or inverse document transformations, as described above.

The normalized message is then provided to the trained modified Bayesian classifier 518, where a probability of a feature not being present in a class or type of message is determined using weights 520-522 (weights 520-522 are substantially the same weights 420-422 determined in FIG. 4). The resulting output also includes a list of tokens 515 for the given message.

Continuing to block 530, a complement probability value is calculated for all of the features (all the distinct tokens appearing in the training set) for each of the identified classes or types of messages. At block 532, the resulting complement probability scores for each class are then compared to assign the message to that message class or type with the smallest or lowest complement probability score. Flowing next to block 534, the message class determined at block 532, the token list 515, and a token threshold is returned to the calling process. In one embodiment, the calling process is described in more detail below in conjunction with FIG. 6.

Client Classifier Component

FIG. 6 illustrates a logical flow diagram generally showing one embodiment of a client classifier component's process using a two phased spam detector to classify a message as spam or non-spam. In one embodiment, process 600 of FIG. 6 may be implemented in a client device, such as client devices 101-104 of FIG. 1. However, in another embodiment, process 600 may be performed in MSMF 106 of FIG. 1 for each client device.

In any event, process 600 begins, after a start block, at block 602, where a message is received. In one embodiment, the message may be received from another user, merchant, or virtually any other source, including, but not limited to a spammer.

The received message may be submitted, at block 604, to a statistical classifier, such as the modified complement naïve Bayesian classifier described above in conjunction with FIGS. 4-5. Continuing to block 606, received from the statistical classifier is a token list, token threshold, and a message class for the message sent at block 604.

Processing then flows to block 608, which is described in more detail below in conjunction with FIGS. 7-8. Briefly, however, the token list, and message class are submitted to a targeted token frequency model that is directed towards analyzing messages for a particular message class. Flowing to block 610, received from the token frequency model is a number of matched tokens for the message class for the message based on the token list.

Proceeding to decision block 612, a determination is made whether the number of matched tokens exceeds the token threshold. If so, then the message is considered to be spam, and processing flows to decision block 616; otherwise, processing flows to block 614, where the message is considered to be non-spam. From block 614 processing flows to block 620.

At decision block 616 a determination is made whether a message sender of the determined spam message is on a white list. That is, although the message may be determined to be spam, is it actually allowable for sending? Such determination may be based on a variety of criteria, including that a number of users have indicated that the message is to be allowed from a particular sender, or the like. Although a white list is illustrated, a black list may also be used in which a sender address on such a list is to be considered as a spammer. In another embodiment a grey-list may be used where a message sender on the list might indicate that additional testing is requested. For example, a message from such a grey-listed sender address might be allowable by some users, but not others. In any event, if the message sender is determined to be allowed to send the message, then processing flows to block 614; otherwise, processing flows to block 618.

At block 618, the message is marked, label, tagged, or otherwise identified as being spam. Processing then continues to block 620, where the message is then send to the user's messenger. In one embodiment, the message may include a tag, label, or the like, indicating whether the message is spam, non-spam, or the like. In another embodiment, the message might be delivered to a particular folder, mailbox, or the like, that is identified for receiving a particular type of messages, such as a spam folder, an inbox, a junk folder, or the like.

Processing then continues to decision block 622, where a determination is made whether there are more messages to be classified. If so, process 600 loops back to block 602; otherwise, processing returns to a calling process to perform other actions.

Token Frequency Based Model

Figure 7:
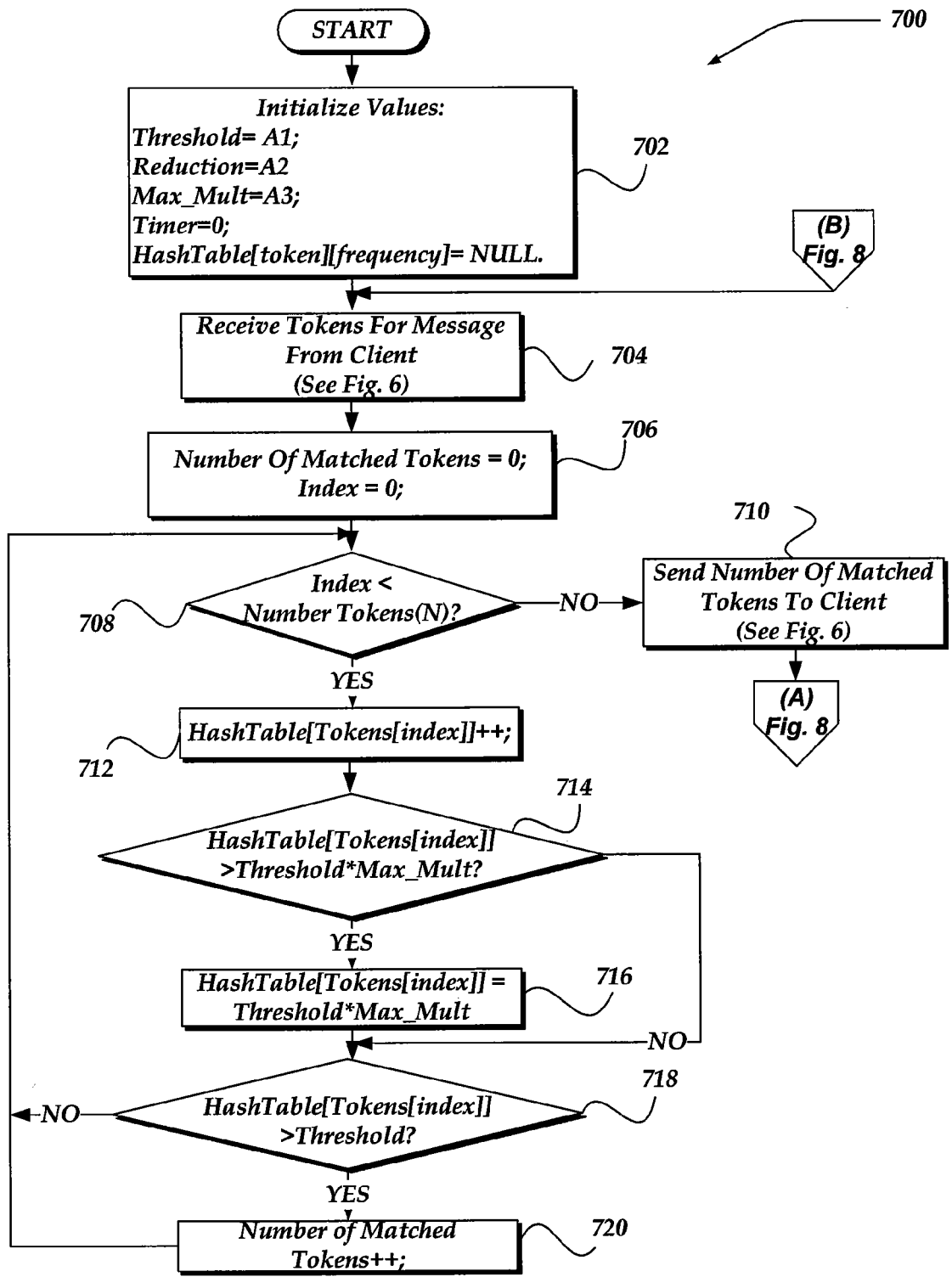
FIGS. 7-8 illustrates a logical flow diagram generally showing one embodiment of a server process for classifying a message using a token frequency based approach.
Figure 8:
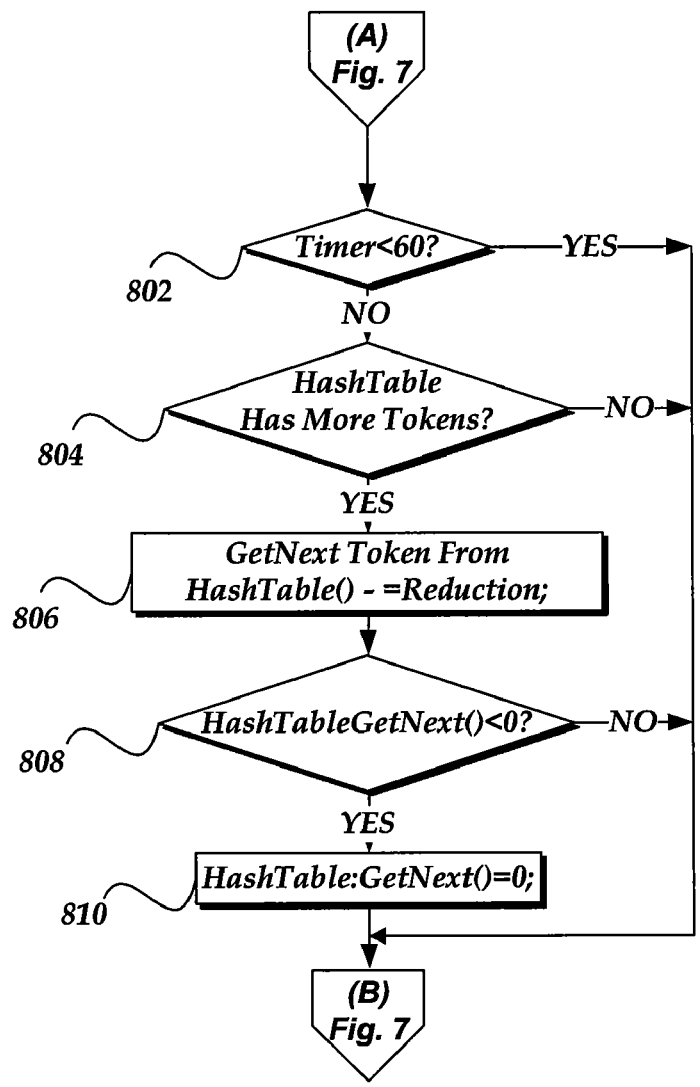

FIGS. 7-8 illustrates a logical flow diagram generally showing one embodiment of a server process for classifying a message using a token frequency based approach. Process 700 of FIGS. 7-8 may be implemented, in one embodiment, within MSMF 106 of FIG. 1.

Process 700 of FIGS. 7-8 begins, after a start block, at block 702, where various values are initialized. As illustrated, such values may include, but are not limited to a frequency threshold. While the threshold may be set to virtually any integer value, in one embodiment, the value may be set to between about 10 and about 200. Reduction represents an expiration or aging value useable to expire tokens over time. In one embodiment, reduction might be set initially to a value between about 5 to about 10 counts per minute. Max_mult represents a maximum multiplier to limit a frequency value count. In one embodiment, max_mult might initially be set to a value between about 5 and about 100. It should be noted that other values, and/or value ranges may also be selected, and thus, the invention is not to be limited by these values.

Also illustrated are other values useable for this embodiment, including a timer (set initially to zero), and a hash table that is initially nulled out. As noted, the hash table is configured to represent a list of the tokens and their associated frequencies. Thus, process 700 is arranged to examine each token to determine if their respective frequency exceeds a weighted aged threshold frequency that is determined by the Bayesian classifier and aged over time by process 700 as described in more detail below.

Processing then flows to block 706, where tokens for a given message are received. Such tokens may be a list of tokens determined by a tokenizer for the given message. In one embodiment, the list of tokens is received for each client from a process such as described above in conjunction with FIG. 6.

Processing continues next to block 706, where an index into the hash table is initialized, as is a number of matched tokens.

Processing then proceeds to decision block 708, where a determination is made whether the index is less than a number of tokens, N, where N represents a size or count of the number of tokens in the received token list. If the index is less than N, processing continues to block 712; otherwise, processing flows to block 710.

At block 712, the location within the hash table is incremented, such that each token and its associated frequency in the message within the token list may be examined. Processing flows next to decision block 714, where a determination is made whether the frequency for the given token in the hash table exceeds a threshold times max_mult. If so, then processing flows to block 716; otherwise, processing loops to decision block 718.

At block 716, the frequency for the token in the hash table is set to the threshold times max_mult, to avoid any single token from overwhelming the frequency count. Processing then flows to decision block 718.

At decision block 718, a determination is made whether the frequency for the token in the hash table for the message exceeds the threshold. That is, does the modified frequency for the token exceed a frequency threshold for the token? If so, then the number of matched tokens is incremented at block 720. Processing then loops back to decision block 708 until all of the tokens have been examined. If the frequency for the token in the hash table for the message does not exceed the threshold, processing also loops back to decision block 708.

At block 710, the number of matched tokens determined by token frequency based process 700 is sent to the client.

Processing then flows to decision block 802 of Process 700 to proceed to age the tokens. Such token aging is performed in recognition that many spammers may select to send certain spam type of messages over a selected time period, and not during other times. These bursts of spam messages might otherwise skew spam classifications. Thus, tokens are expired over time to reduce their influence on message classifications.

Thus, at decision block 802, a determination is made whether a time of a timer is less than 60. 60 is selected to age tokens over a minute. However, the invention is not limited to one minute, and other values may also be selected. In any event, if the timer is determined to be less than 60, processing proceeds to loop back to block 704, where other tokens may be received from a client component. However, if the timer is less than 60, processing continues to decision block 804, where a determination is made whether there are any more tokens in the hash table to be expired. If not, then processing loops back to block 704; otherwise processing continues to block 806.

At block 806, the next token frequency within the hash table is reduced by some rate equal to the initialized value of reduction. Processing then continues to decision block 808, where a determination is made whether there hash table returns a frequency count that is less than zero. If so, processing flows to block 810, where the frequency count is set to zero. If the frequency count is not less than zero, then processing loops back to block 704. If the frequency is set to zero, at block 810, processing also loops back to block 704.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

ILLUSTRATIVE EXAMPLE

The following provides a non-exhaustive, non-limiting example of the token frequency based model for various messages. Consider, for example, that a list of tokens and corresponding counts are maintained, where, the threshold is set to 20, max_mult is set to 5, and reductions is set to 5. As noted elsewhere, other values may be used, and thus, these values should not be used to limit or otherwise narrow the invention.

In the example, consider there are two clients A and B, and at time zero, the token hash table appears as the following, with the numbers next to the tokens illustrating a frequency count of for the respective token.

| | | |
|---|---|---|
| 1. | Nigeria | 25 |
| 2. | Bank | 40 |
| 3. | Nigerian | 30 |
| 4. | Check | 100 |
| 5. | Money | 99 |
| 6. | Greetings | 19 |
| 7. | Congratulate | 5 |
| 8. | Good | 8 |

At time 30 seconds, client A receives an email from what appears to be Bank of America, regarding the client's monthly statement. Based on the use of the Complement naïve Bayesian Classifier, the message is classified as a Nigerian spam message. Furthermore, the Bayesian classifier also sends a list of tokens for the message that includes:

Bank, hello, good, check, and congratulate.

At this stage in the example, the maximum number of matched tokens is three at the client side. After the server component receives the list of tokens and updates its hash table, the hash table might appear as follows:

| | | |
|---|---|---|
| 1. | Nigeria | 25 |
| 2. | Bank | 41 (increased by one) |
| 3. | Nigerian | 30 |
| 4. | Check | 100 (although the count was increased, the tokens exceeded the limit (threshold * max_mult = 20 * 5 = 100). Therefore, the count or frequency remains 100. |
| 5. | Money | 99 |
| 6. | Greetings | 19 |
| 7. | Congratulate | 6 (increased by one) |
| 8. | Good | 9 (increased by one) |
| 9. | hello | 1 (new token) |

At this juncture, the number of matched tokens which pass the threshold (20) is two: bank and check. The number that is then sent back to the client A is two. When client A receives the number, it finds that it is less than the maximum number of matched tokens. So, client A's message will be determined to be non-spam.

At time 60 seconds, assume now that client B receives a message from a "prince: in Nigeria. Based on the use of the Complement naïve Bayesian Classifier, the message is classified again as a Nigerian spam message. Furthermore, the Bayesian classifier also sends a list of tokens for the message that includes:

Bank, Nigeria, money, greetings, congratulate, check.

After the token frequency based model receives the list of tokens and updates its hash table, the hash table may appear like:

| | | |
|---|---|---|
| 1. Nigeria | 26 (increased count) | |
| 2. Bank | 41 (increased count) | |
| 3. Nigerian | 30 | |
| 4. Check | 100 (again, because this token has exceeded the limit, it remains at 100). | |
| 5. Money | 100 (increased count) | |
| 6. Greetings | 20 (increased count) | |
| 7. Congratulate | 7 (increased count) | |
| 8. Good | 9 (increased count) | |
| 9. hello | 1 | |

Now, the tokens Nigeria, bank, check, money, and greetings are considered to be bad, and the number 5 will be sent back to client B. Client B determines that the number is above the threshold (3), so this message is classified as Nigerian spam.

To continue, at the server side, time as exceeded 60 seconds, so the hash table is examined and tokens are expired as appropriate. A reduction may be applied to the count or frequency of tokens in the hash table to result, in one embodiment, a hash table having the following:

| | | |
|---|---|---|
| 1. | Nigeria | 21 |
| 2. | Bank | 37 |
| 3. | Nigerian | 25 |
| 4. | Check | 95 |
| 5. | Money | 95 |
| 6. | Greetings | 15 |
| 7. | Congratulate | 2 |
| 8. | Good | 94 |

As noted, token 9 hello is removed, in one embodiment, because the token count has reached zero. This removal from the token hash table is performed to save space for other tokens. However, such removal need not be performed.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device, comprising:
  a transceiver device that is operative to send and receive data over a network; and
  a processor device that is operative to perform actions, comprising:
    receiving a message;
    determining a plurality of tokens from the received message based in part on a text body of the received message;
    analyzing the plurality of tokens to assign probability values that the received message is classifiable as one of a plurality of message classes, including a spam message and a non-spam message;
    selecting a message class for the received message based on a comparison of the assigned probability values, wherein a probability value is associated with each of the plurality of message classes, wherein the assigned probability values represent a plurality of complement probability values for each of the plurality of message classes, and wherein selecting the message class further comprises selecting a message class having a lowest complement probability value;
    providing the message class selected, a list of tokens with associated token frequencies, and the plurality of tokens to a token frequency component that is configured for the selected message class, wherein the list of tokens are determined for the message class selected; and
    using the token frequency component to determine a number of tokens in the plurality of tokens that result in an associated token frequency for each matching token in the list of tokens exceeding a token frequency threshold, wherein each number of tokens resulting in the associated token frequency and is selectively decremented over time as a period of time expires for each corresponding token; and
    based on a comparison between a number of matching tokens in the received message for the selected message class to a matched token threshold provided by the frequency threshold component, identifying whether the received message is a spam message or a non-spam message.

2. The network device of claim 1, wherein analyzing the plurality of tokens and selecting a message class comprises employing a naive Bayesian Classifier.

3. The network device of claim 1, wherein the tokens in the list of tokens for the message class selected expire over time.

4. The network device of claim 1, wherein the processor device that is operative to perform actions, further comprising employing a white list to further classify the received message.

5. A processor readable non-transitory storage medium that includes data and instructions, wherein the execution of the instructions on a computing device provides for managing messages by enabling actions, comprising:
  receiving a message;
  determining a plurality of tokens from the received message based in part on a text body of the received message;
  employing a statistical classifier to:
    analyze the plurality of tokens to assign a plurality of probability values that the received message is classifiable as one of a plurality of message classes, wherein a probability value is assigned to each of the plurality of message classes;
    select a message class for the received message based on a comparison of the plurality of probability values, wherein the assigned probability values represent a plurality of complement probability values for each of the plurality of message classes, and wherein selecting the message class further comprises selecting a message class having a lowest complement probability value; and
  employing a token frequency component that is operative based on the selected message class to determine a number of tokens in the plurality of tokens that result in a respective token count for each token in a list of tokens for the selected message class exceeding a token frequency threshold, wherein each token count associated with each token in the list is selectively decremented over time as a period of time expires for each corresponding token;
  performing a comparison between the number of matching tokens in the received message for the selected message class to a matched token threshold provided by the token frequency component to identify whether the received message is a spam message or a non-spam message; and employing the message identification as spam or non-spam to at least one of tagging the message, or distributing the message into a message folder.

6. The processor readable non-transitory storage medium of claim 5, wherein the statistical classifier is configured to operate as at least one of a Bayesian classifier, a Support-Vector machine, logistic regression classifier, perceptron, a Markovian discrimination classifier, a neural network, or a decision tree.

7. The processor readable storage non-transitory medium of claim 5, wherein the statistical classifier is further configured to employ at least one of a length normalization, term frequency transformation, or an inverse document transformation in assigning a plurality of probability values.

8. The processor readable non-transitory storage medium of claim 5, wherein determining a number of tokens in the plurality of tokens that result in a respective token count in a list of tokens exceeding a token frequency threshold further comprises:
   modifying a token count for each token in the list of tokens based on the plurality of tokens;
   comparing the resulting modified token count to the token frequency threshold to determine if the modified token count exceeds the token frequency threshold, and if so, incrementing the number of tokens that exceed the token frequency threshold.

9. The processor readable non-transitory storage medium of claim 5, wherein each token in the list of tokens is configured to expire over time such that a given token associated with the message class is removed from the list of tokens after a defined time period.

10. The processor readable non-transitory storage medium of claim 5, wherein the plurality of probability values are complement probability values.

11. A method for managing a message delivery, comprising:
   receiving a message by a network device;
   employing the network device to determine a plurality of tokens from the received message based in part on a text body of the received message;
   employing the network device to analyze the plurality of tokens to assign probability values that the received message is classifiable as one of a plurality of message classes, wherein a probability value is associated with each of the plurality of message classes;
   employing the network device to select a message class for the received message based on a comparison of the assigned probability values, wherein the assigned probability values represent a plurality of complement probability values for each of the plurality of message classes, and wherein selecting the message class further comprises selecting a message class having a lowest complement probability value;
   employing the network device to determine a number of tokens in the plurality of tokens that result in a respective token count for each token in a list of tokens for the selected message class exceeding a token frequency threshold based on the selected message class, wherein each token count for each token in the list is selectively decremented over time as a period of time expires for each corresponding token; and
   based on a comparison between the number of matching tokens in the received message that exceed the token frequency threshold for the selected message class to a matched token threshold provided by a frequency threshold component, employing the network device to identify whether the received message is a spam message or a non-spam message; and
   employing the message identification as spam or non-spam to at least one of tagging the message, or distributing the message into a message folder.

12. The method of claim 11, wherein analyzing and selecting are performed by a complement naive Bayesian classifier.

13. The method of claim 11, wherein determining a number of tokens further comprises employing a maximum multiplier to limit a token count.

14. The method of claim 11, wherein the tokens in the list of tokens are configured to expire over time.

15. The method of claim 11, wherein a statistical classifier that is used to assign probability values is also trained based on messages of known message classes, and wherein the training includes employing at least one of a length normalization for the messages, term frequency transformation, or an inverse message transformation.

* * * * *